Oct. 17, 1950     A. H. HEINEMAN     2,525,800
HIGH-SPEED PACKING
Filed June 4, 1945
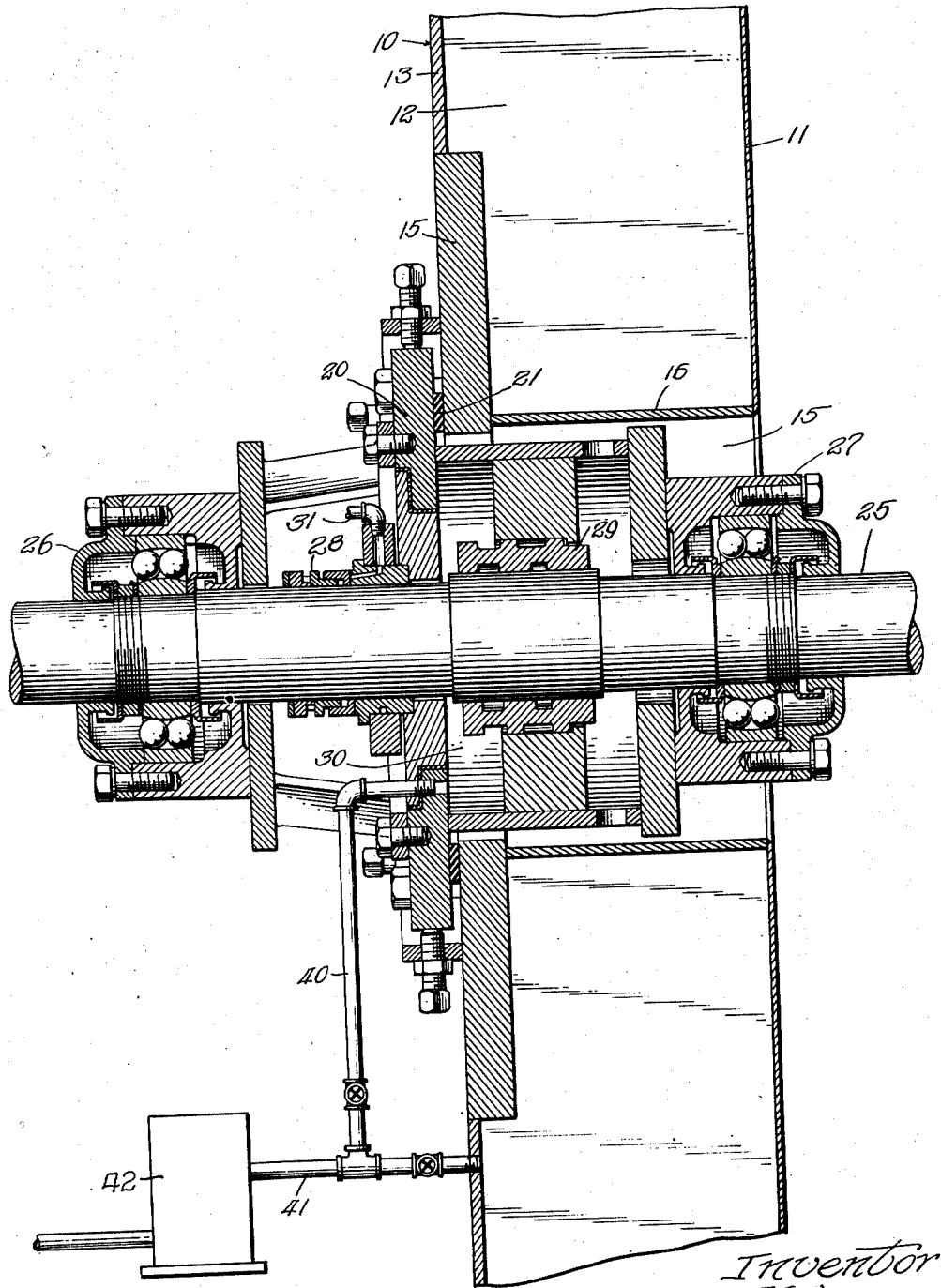

Patented Oct. 17, 1950

2,525,800

UNITED STATES PATENT OFFICE 2,525,800

HIGH-SPEED PACKING

Arnold H. Heineman, Chicago, Ill., assignor, by mesne assignments, to Guardite Corporation, Wilmington, Del., a corporation of Delaware Application June 4, 1945, Serial No. 597,390

1 Claim. (Cl. 286—8)

This invention relates to high speed packing, and more particularly to a box seal in the wall of a high vacuum chamber through which box seal a high speed shaft is passed.

The invention relates primarily to vacuum chambers used for testing aircraft engines under conditions at low temperature and low pressure, and where pressure variations and temperature variations within the chamber may occur rapidly and frequently. It is frequently desirable in such devices to have a shaft through the wall of the chamber operating at high speed for various test purposes. Oil leakage from the shaft bearings into the chamber is, however, highly undesirable and the present invention overcomes this difficulty by providing a box seal on the shaft having two sealing elements with a chamber between them, which chamber is independently evacuated to a pressure lower than that prevailing in either the vacuum chamber or the outside atmosphere. As a result, leakage from either seal is directed toward the chamber and from there is removed through the vacuum line.

The invention is illustrated in the drawing in which 10 represents a vacuum chamber provided with suitable means for producing low pressure and temperature, and preferably also with means for rapidly heating the interior of the structure. These means are conventional, and not shown here.

Because of the low temperature employed within the device, it is preferred to use a membrane inner wall 11 which does not bear the vacuum stresses, and it is separated by the insulating chamber 12 from the stress carrying outer wall 13. The intervening space may be packed with insulation or the wall 11 may otherwise be suitably braced. As set forth in my copending application Serial No. 498,146, filed August 11, 1943, now Patent No. 2,439,806, the chamber 12 is evacuated to a pressure somewhat lower than the pressure within the main vacuum chamber so that there is never any inward pressure upon the diaphragm or membrane 11.

An opening 15 is provided in the wall, and this opening is sealed in a suitable fashion, as by partitions 16, from the chamber 12. A box seal 20 is suitably mounted in the opening and may be sealed in position as by the gasket 21. A shaft 25 passes through the box seal and is journalled in bearings 26 and 27. The box seal includes a pair of sealing members 28 and 29 which engage the shaft on opposite sides of a chamber 30. The seal 28 is illustrated as a carbon face seal provided with a lubricant feeding line 31. The seal 29 is illustrated as a labyrinth seal of conventional form. Both seals are, of course, associated with walls which complete the closure.

The chamber 30 communicates with a vacuum line 40 leading to a vacuum pump or ejector 42 of sufficient strength to produce a lower vacuum within the chamber 30 than prevails within the main vacuum chamber 10. This line 40 may, of course, communicate with the main vacuum line 41 which maintains the chamber 12 at a pressure lower than the chamber 10.

It will be noted that any leakage of oil from either of the seals 28 or 29, or any leakage of air from the outside, with possible contaminating moisture, will be directed into the chamber 30 and removed therefrom through the line 40. The removal of moisture is an important factor and in these test chambers it is particularly advantageous to control the humidity at narrow limits.

The foregoing detailed description has been given for clearness of understanding only, and no unnecessary limitations should be understood therefrom.

What I claim as new, and desire to secure by Letters Patent, is:

Packing for a high speed shaft extending through an opening in a wall of a vacuum vessel, comprising: A sealing box associated with the shaft and the opening, and having a pair of spaced sealing elements in sealing engagement with the shaft and a closed chamber between the sealing elements; and means communicating with said closed chamber for maintaining a lower pressure within the chamber than prevails in the vacuum vessel when the vessel is under vacuum.

ARNOLD H. HEINEMAN.

REFERENCES CITED

The following references are of record in the file of this patent:

UNITED STATES PATENTS

| Number | Name | Date |
| --- | --- | --- |
| 811,833 | Emmet | Feb. 6, 1906 |
| 1,301,387 | Coe | Apr. 22, 1919 |
| 1,328,286 | McClave | Jan. 20, 1920 |
| 1,603,206 | Hull | Oct. 12, 1926 |
| 1,838,053 | Eliason | Dec. 21, 1931 |
| 2,112,461 | Kohler | Mar. 29, 1938 |